US009152266B2

(12) United States Patent
Kim et al.

(10) Patent No.: US 9,152,266 B2
(45) Date of Patent: Oct. 6, 2015

(54) TOUCH SENSOR INTEGRATED TYPE DISPLAY AND METHOD FOR DRIVING THE SAME

(71) Applicant: LG DISPLAY CO., LTD., Seoul (KR)

(72) Inventors: Keunchoul Kim, Paju-si (KR); Suhyeon Jo, Ulsan (KR)

(73) Assignee: LG DISPLAY CO., LTD., Seoul (KR)

( * ) Notice: Subject to any disclaimer, the term of this patent is extended or adjusted under 35 U.S.C. 154(b) by 256 days.

(21) Appl. No.: 13/713,590

(22) Filed: Dec. 13, 2012

(65) Prior Publication Data

US 2013/0147744 A1    Jun. 13, 2013

(30) Foreign Application Priority Data

Dec. 13, 2011    (KR) .......................... 10-2011-0133961

(51) Int. Cl.
  *G06F 3/041*    (2006.01)
  *G06F 3/044*    (2006.01)

(52) U.S. Cl.
  CPC .............. *G06F 3/0412* (2013.01); *G06F 3/044* (2013.01); *G06F 3/0416* (2013.01); *G06F 3/0418* (2013.01)

(58) Field of Classification Search
  CPC .............................................. G09G 2320/0233
  See application file for complete search history.

(56) References Cited

U.S. PATENT DOCUMENTS

2007/0296661 A1*    12/2007    Ishiguchi ...................... 345/87
2012/0050217 A1*    3/2012    Noguchi et al. .............. 345/174

FOREIGN PATENT DOCUMENTS

| CN | 101097390 A | 1/2008 |
| CN | 101630081 A | 1/2010 |
| CN | 102375639 A | 3/2012 |
| KR | 1020080000533 A | 1/2008 |
| KR | 1020100011571 A | 2/2010 |
| KR | 1020110108036 A | 10/2011 |

OTHER PUBLICATIONS

Office Action issued in Korean Patent Application No. 10-2011-0133961, mailed Dec. 19, 2014, 4 pages.
Office Action dated Jul. 1, 2015 for corresponding Chinese Patent Application No. 201210539046.1, 25 pages.

* cited by examiner

*Primary Examiner* — Seokyun Moon
*Assistant Examiner* — Peijie Shen
(74) *Attorney, Agent, or Firm* — Brinks Gilson & Lione

(57) ABSTRACT

A touch sensor integrated type display includes a display panel including a touch screen having touch sensors, a data driving circuit for driving data lines of the display panel, and a timing controller for generating a control signal for controlling a potential of an output terminal of the data driving circuit in vertical blank periods between adjacent vertical periods. The control signal selectively floats source output channels of the data driving circuit or selectively sets a potential of the source output channels to a predetermined voltage in the vertical blank periods.

16 Claims, 15 Drawing Sheets

FIG. 6

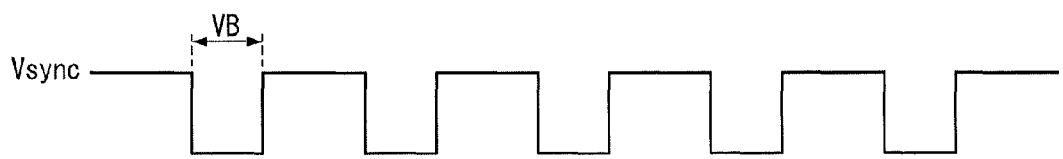

| D1 | Video Data | Non Hi-Z | Video Data | Non Hi-Z | Video Data | Non Hi-Z | Video Data | Non Hi-Z | Video Data | Non Hi-Z | Video Data |
| D2 | Video Data | Non Hi-Z | Video Data | Non Hi-Z | Video Data | Non Hi-Z | Video Data | Non Hi-Z | Video Data | Non Hi-Z | Video Data |
| ⋮ | ⋮ | ⋮ | ⋮ | ⋮ | ⋮ | ⋮ | ⋮ | ⋮ | ⋮ | ⋮ | ⋮ |
| D720 | Video Data | Non Hi-Z | Video Data | Non Hi-Z | Video Data | Non Hi-Z | Video Data | Non Hi-Z | Video Data | Non Hi-Z | Video Data |
| D721 | Video Data | Non Hi-Z | Video Data | Non Hi-Z | Video Data | Non Hi-Z | Video Data | Non Hi-Z | Video Data | Non Hi-Z | Video Data |
| ⋮ | ⋮ | ⋮ | ⋮ | ⋮ | ⋮ | ⋮ | ⋮ | ⋮ | ⋮ | ⋮ | ⋮ |
| D1439 | Video Data | Non Hi-Z | Video Data | Non Hi-Z | Video Data | Non Hi-Z | Video Data | Non Hi-Z | Video Data | Non Hi-Z | Video Data |
| D1440 | Video Data | Non Hi-Z | Video Data | Non Hi-Z | Video Data | Non Hi-Z | Video Data | Non Hi-Z | Video Data | Non Hi-Z | Video Data |

Regular or irregular
distribution based on time

Regular or irregular
distribution based on position

Distribution based on time

FIG. 12

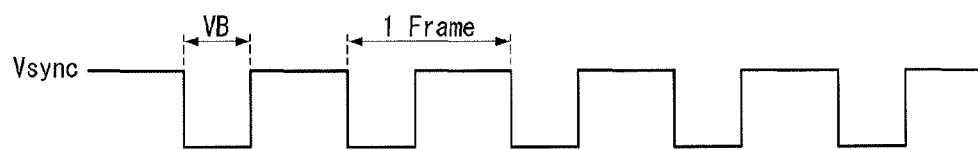

| D1 | Video Data | Non Hi-Z | Video Data | Hi-Z | Video Data | Non Hi-Z | Video Data | Hi-Z | Video Data | Non Hi-Z | Video Data |
| --- | --- | --- | --- | --- | --- | --- | --- | --- | --- | --- | --- |
| D2 | Video Data | Non Hi-Z | Video Data | Hi-Z | Video Data | Non Hi-Z | Video Data | Hi-Z | Video Data | Non Hi-Z | Video Data |
| ⋮ | ⋮ | ⋮ | ⋮ | ⋮ | ⋮ | ⋮ | ⋮ | ⋮ | ⋮ | ⋮ | ⋮ |
| D720 | Video Data | Non Hi-Z | Video Data | Hi-Z | Video Data | Non Hi-Z | Video Data | Hi-Z | Video Data | Non Hi-Z | Video Data |
| D721 | Video Data | Hi-Z | Video Data | Non Hi-Z | Video Data | Hi-Z | Video Data | Non Hi-Z | Video Data | Hi-Z | Video Data |
| ⋮ | ⋮ | ⋮ | ⋮ | ⋮ | ⋮ | ⋮ | ⋮ | ⋮ | ⋮ | ⋮ | ⋮ |
| D1439 | Video Data | Hi-Z | Video Data | Non Hi-Z | Video Data | Hi-Z | Video Data | Non Hi-Z | Video Data | Hi-Z | Video Data |
| D1440 | Video Data | Hi-Z | Video Data | Non Hi-Z | Video Data | Hi-Z | Video Data | Non Hi-Z | Video Data | Hi-Z | Video Data |

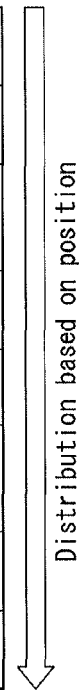

Distribution based on time →

FIG. 16
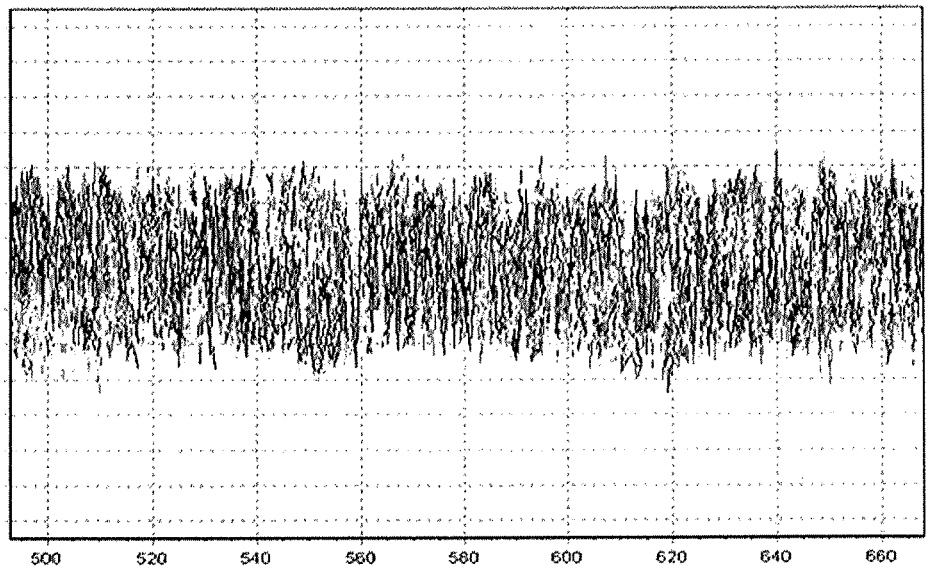
Touch noise in related art
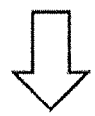
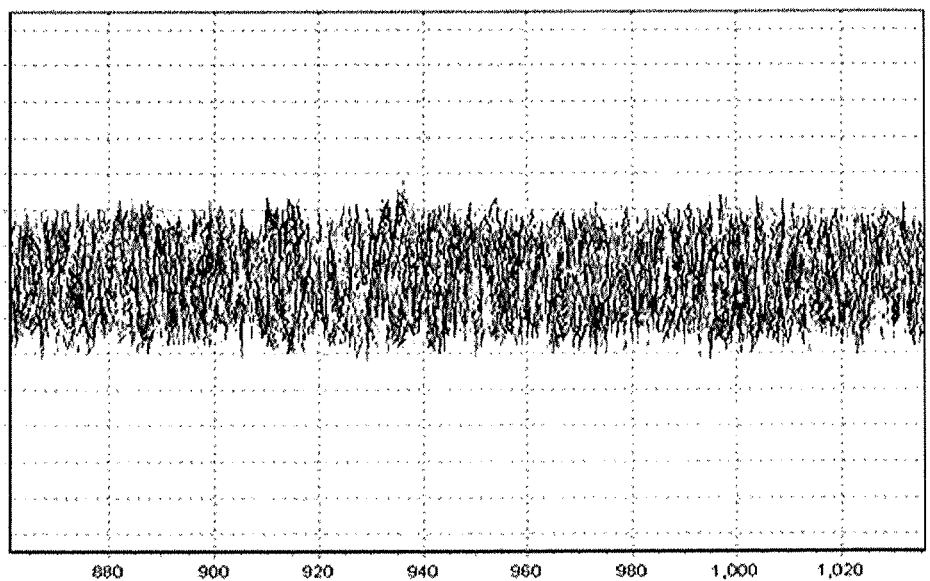
Touch noise in present invention

TOUCH SENSOR INTEGRATED TYPE DISPLAY AND METHOD FOR DRIVING THE SAME

CROSS-REFERENCE TO RELATED APPLICATIONS

This application claims the priority benefit of Korean Patent Application No. 10-2011-0133961 filed on Dec. 13, 2011, which is incorporated herein by reference in its entirety for all purposes as if fully set forth herein.

FIELD OF THE DISCLOSURE

Embodiments of the invention relate to a touch sensor integrated type display and a method for driving the same.

BACKGROUND

A touch screen has replaced button switches as a user input device in order to provide light weight and a thin profile to household appliances and electronic devices. The touch screen is a device configured such that a user directly touches the screen without the use of other input devices and input information. Touch screens are now being used in the cellular phone market and have been widely used in most IT products.

The touch screen used in a display device includes a plurality of touch sensors and may be attached to a display panel of the display device. The touch screen may be classified into a resistive type touch screen, a capacitive type touch screen, an electromagnetic type touch screen, etc. based on its touch recognition manner. The capacitive type touch screen, which senses a position having changes in a capacitance and senses a touched portion, has been widely used.

As shown in FIGS. 1 and 2, a capacitive type touch screen includes a plurality of Tx electrode lines T1 to Tn, a plurality of Rx electrode lines R1 to Rm crossing the Tx electrode lines T1 to Tn, and a plurality of touch sensors formed at crossings of the Tx electrode lines T1 to Tn and the Rx electrode lines R1 to Rm, where m and n are a natural number. Each of the touch sensors is implemented as a mutual capacitor Cm. When a user touches the capacitive type touch screen with his or her finger, etc., an electric field between Tx and Rx electrodes of the mutual capacitor Cm is blocked. Hence, the amount of charge of the mutual capacitor Cm decreases. The touch sensors sense changes in the charge amount of the mutual capacitor Cm before and after a touch operation. For this, a charge voltage of the mutual capacitor Cm is readout to a readout integrated circuit (ROIC) through the Rx electrode lines R1 to Rm when a touch driving pulse is supplied to the Tx electrode lines T1 to Tn.

A display panel of a display device includes a plurality of data lines D1 to Dm to which a data voltage is applied. The Rx electrode lines R1 to Rm extend in the same direction as an extending direction of the data lines D1 to Dm and may partially overlap the data lines D1 to Dm. In this instance, the Rx electrode lines R1 to Rm and the data lines D1 to Dm, which partially overlap each other, are coupled to a parasitic capacitance Crx between the lines R1 to Rm and D1 to Dm.

Changes in a potential of the data lines D1 to Dm affect a potential of the Rx electrode lines R1 to Rm because of the parasitic capacitance Crx, thereby leading to a coupling noise. The coupling noise is mixed in a touch signal and thus greatly reduces a touch performance of the touch screen. As the coupling noise increases, a sensing value obtained by the touch screen may be excessively distorted. Hence, an undesired touch result may be obtained. Accordingly, a method for increasing a sampling rate (defined by the number of sampling operations per unit of time, for example, during one touch frame period) of sensing voltages readout by the touch sensors may be considered, so as to reduce the coupling noise. However, in this instance, the power consumption of the ROIC also increases.

SUMMARY

In one aspect, there is a touch sensor type display including a display panel including a touch screen having touch sensors, a data driving circuit configured to drive data lines of the display panel, and a timing controller configured to generate a control signal for controlling a potential of an output terminal of the data driving circuit in vertical blank periods between adjacent vertical periods, wherein the control signal selectively floats source output channels of the data driving circuit or selectively sets a potential of the source output channels to a predetermined voltage in the vertical blank periods.

In another aspect, there is a method for driving a touch sensor type display including a display panel including a touch screen having touch sensors and a data driving circuit for driving data lines of the display panel, the method including generating a control signal for controlling a potential of an output terminal of the data driving circuit in vertical blank periods between adjacent vertical periods, and selectively floating source output channels of the data driving circuit or selectively setting a potential of the source output channels to a predetermined voltage in the vertical blank periods in response to the control signal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 6 illustrates an example where data lines are set to a predetermined voltage in vertical blank periods in a lump;

FIG. 12 illustrates an example where a potential of data lines is alternately in a floating state and a non-floating state at predetermined time intervals and at predetermined position intervals in vertical blank periods;

FIG. 16 illustrates a comparison between a magnitude of a touch noise in a related art and a magnitude of a touch noise in an embodiment of the invention.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts may mislead the embodiments of the invention.

Example embodiments of the invention will be described with reference to FIGS. 3 to 17.

Figure 3:
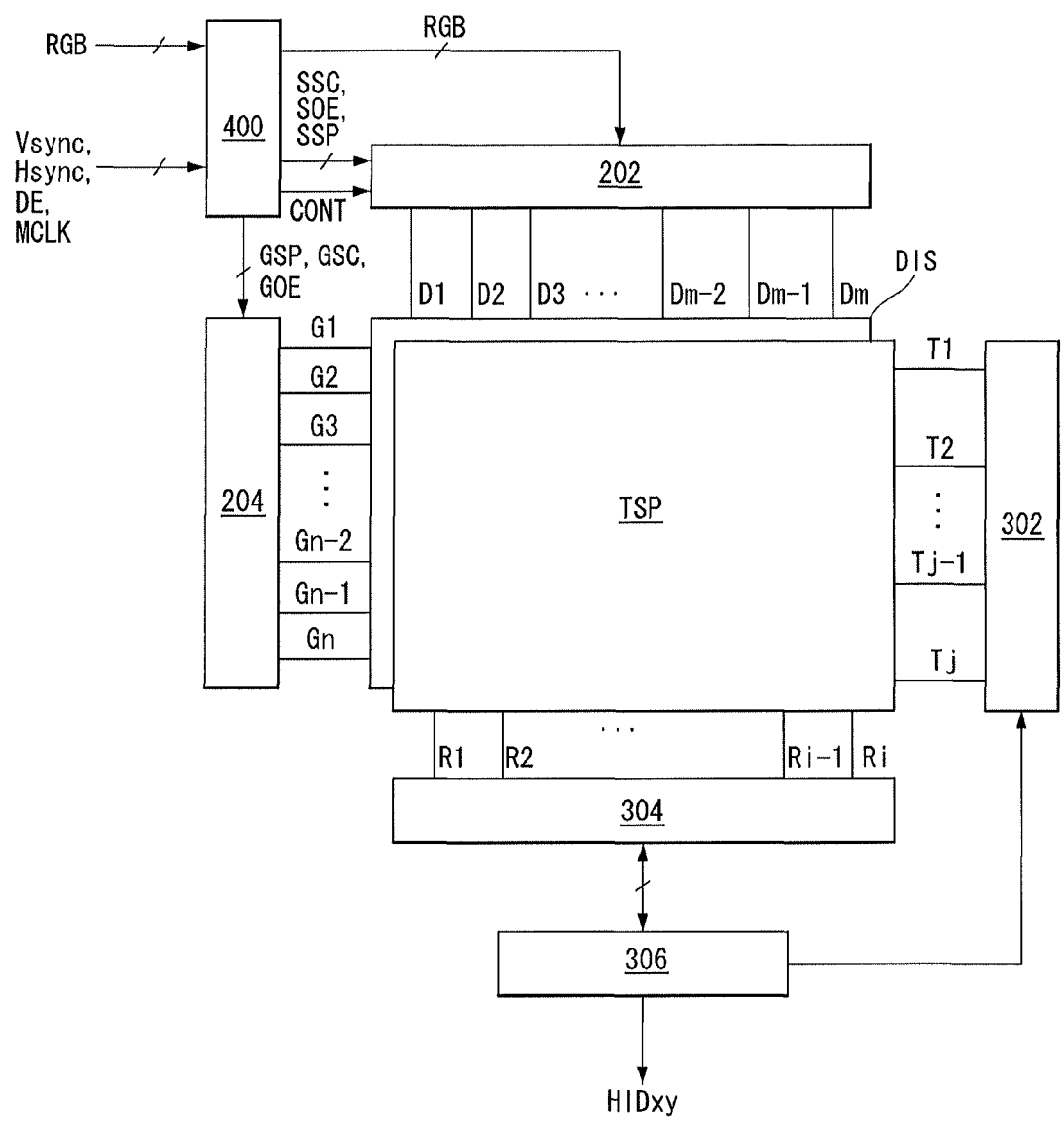
FIG. 3 illustrates a touch sensor integrated type display according to an example embodiment of the invention.

FIG. 3 illustrates a touch sensor integrated type display according to an example embodiment of the invention.

As shown in FIG. 3, a touch sensor integrated type display according to the embodiment of the invention includes a display panel DIS, display driving circuits 202 and 204, a timing controller 400, a touch screen TSP, touch screen driving circuits 302 and 304, a touch controller 306, etc. All components of the display are operatively coupled and configured.

The display according to the embodiment of the invention may be implemented based on a flat panel display, such as a liquid crystal display (LCD), a field emission display (FED), a plasma display panel (PDP), an organic light emitting diode (OLED) display, and an electrophoresis display (EPD). In the following description, the display according to the embodiment of the invention will be described based on the OLED display. Other flat panel displays may be used.

The display panel DIS includes a plurality of data lines D1 to Dm, where m is a natural number, a plurality of gate lines G1 to Gn crossing the data lines D1 to Dm, where n is a natural number, a plurality of pixels formed at crossings of the data lines D1 to Dm and the gate lines G1 to Gn in a matrix form, and the like. Each of the plurality of pixels may include an organic light emitting diode which emits light using a driving current to represent a gray level, a driving thin film transistor (TFT) which controls an amount of the driving current flowing in the organic light emitting diode based on a data voltage, a switching unit including at least one switching TFT which is turned on or off based on a gate pulse (or a scan pulse) received from the gate lines G1 to Gn to thereby set a gate-to-source voltage of the driving TFT and to determine a light emitting timing of the organic light emitting diode, a storage capacitor which uniformly holds a gate voltage of the driving TFT during a predetermined period, etc.

The display driving circuits 202 and 204 include a data driving circuit 202 and a gate driving circuit 204 and apply a video data voltage of an input image to the pixels. The data driving circuit 202 converts video data RGB received from the timing controller 400 into gamma compensation voltages and generates the data voltage. The data driving circuit 202 supplies the data voltage to the data lines D1 to Dm. The gate driving circuit 204 sequentially supplies a scan pulse synchronized with the data voltage to the gate lines G1 to Gn and selects pixel lines of the display panel DIS to which the data voltage is applied. The gate driving circuit 204 generates an emission pulse based on the scan pulse and sequentially supplies the emission pulse to the gate lines G1 to Gn, thereby determining the light emitting timing of each of the pixels. The gate lines G1 to Gn, to which the scan pulse is supplied, may be different from the gate lines G1 to Gn, to which the emission pulse is supplied.

The timing controller 400 receives timing signals, such as a vertical sync signal Vsync, a horizontal sync signal Hsync, a data enable DE, and a main clock MCLK from an external host system. The timing controller 400 generates a data timing control signal and a gate timing control signal for respectively controlling operation timings of the data driving circuit 202 and the gate driving circuit 204 using the timing signals.

The gate timing control signal includes a gate start pulse GSP which indicates a start horizontal line of a scan operation during one vertical period in which one screen is displayed, a gate shift clock GSC which is input to a shift resistor inside the gate driving circuit 204 to sequentially shift the gate start pulse GSP, a gate output enable GOE controlling an output of the gate driving circuit 204, etc.

The data timing control signal includes a source start pulse SSP which indicates a start point of data during one horizontal period in which the data corresponding to one horizontal line is displayed, a source sampling clock SSC which controls a latch operation of data inside the data driving circuit 202 based on its rising or falling edge, a source output enable SOE controlling an output of the data driving circuit 202, etc.

The timing controller 400 generates a control signal CONT for controlling a potential of an output terminal of the data driving circuit 202 in vertical blank periods between adjacent vertical periods. The control signal CONT is supplied to the data driving circuit 202 to thereby selectively float source output channels of the data driving circuit 202 or to selectively set a potential of the source output channels to a predetermined voltage.

The timing controller 400 arranges the video data RGB received from the host system in conformity with the display panel DIS and supplies the arranged video data RGB to the data driving circuit 202.

Figure 1:
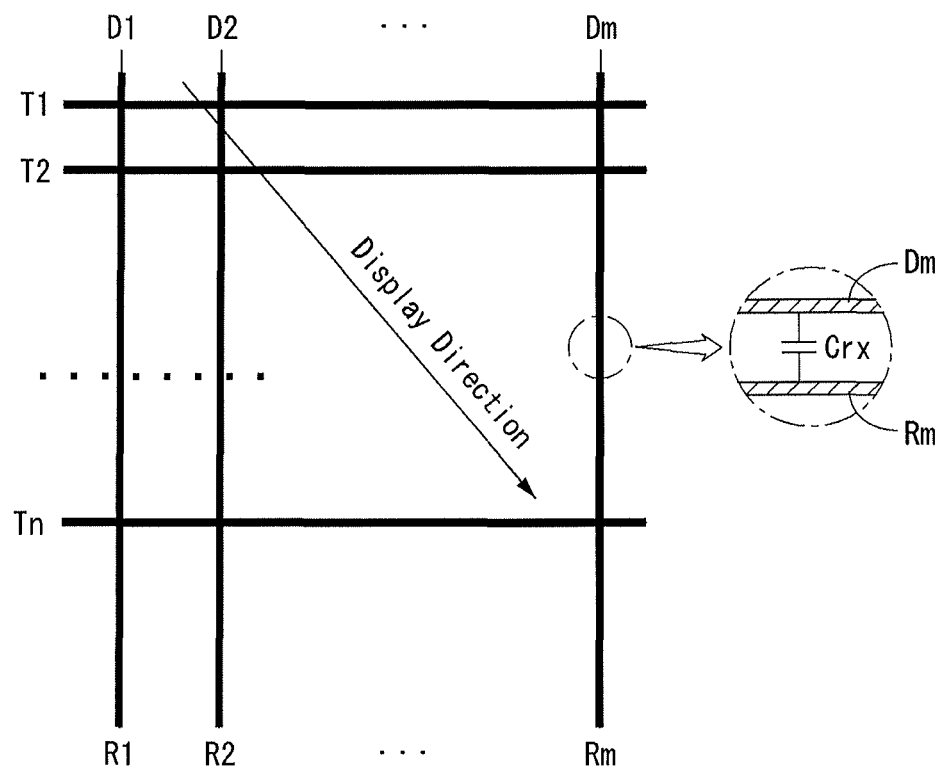
FIG. 1 illustrates an example where Rx electrode lines of a touch screen partially overlap data lines of a display panel.
Figure 2:
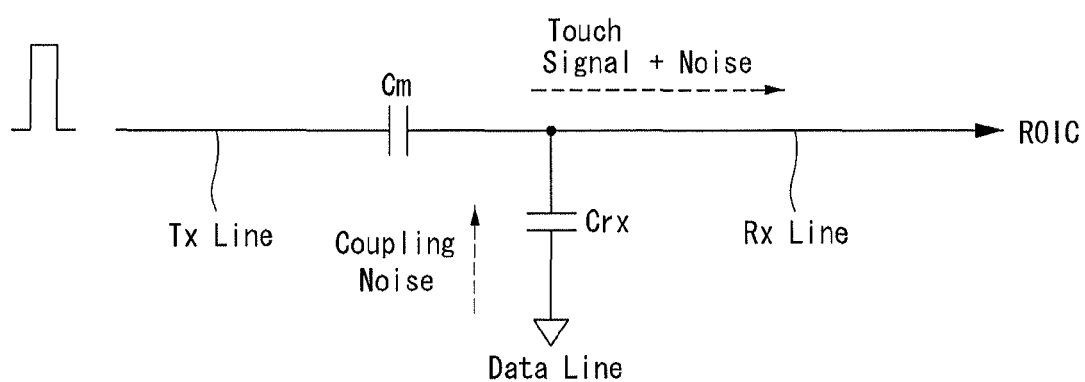
FIG. 2 illustrates an example where a coupling noise is mixed in a touch signal due to a parasitic capacitance.

The touch screen TSP includes Tx electrode lines T1 to Tj, where j is a positive integer, Rx electrode lines R1 to Ri crossing the Tx electrode lines T1 to Tj, where i is a positive integer, and a plurality of touch sensors formed at crossings of the Tx electrode lines Ti to Tj and the Rx electrode lines R1 to Ri. The Rx electrode lines R1 to Ri extend in the same direction as an extending direction of the data lines D1 to Dm and may partially overlap the data lines D1 to Dm. In this instance, the Rx electrode lines R1 to Ri and the data lines D1 to Dm, which partially overlap each other, may be coupled to a parasitic capacitance Crx (refer to FIG. 2) between the lines R1 to R1 and D1 to Dm. Each of the touch sensors is implemented as a mutual capacitor Cm (refer to FIG. 2) formed at each of the crossings of the Tx electrode lines T1 to Tj and the Rx electrode lines R1 to Ri. The touch sensors may be embedded in the display panel DIS in an in-cell type. Alternatively, the touch sensors may be attached on the display panel DIS in an on-cell type or add-on cell type.

The touch screen driving circuits 302 and 304 include a Tx driving circuit 302 and an Rx driving circuit 304. The Tx driving circuit 302 supplies a touch driving pulse to the Tx electrode lines T1 to Tj. Further, the Rx driving circuit 304 samples a charge voltage of the touch sensors through the Rx electrode lines R1 to Ri and converts the sampled charge voltage into digital data. The Tx driving circuit 302 and the Rx driving circuit 304 may be integrated into a readout integrated circuit (ROIC).

The Tx driving circuit 302 sets a Tx channel to output the touch driving pulse under the control of the touch controller 306. The Tx driving circuit 302 generates the touch driving pulse and supplies the touch driving pulse to the Tx electrode lines T1 to Tj connected to the Tx channel under the control of the touch controller 306. The Tx driving circuit 302 may repeatedly supply the touch driving pulse to each of the Tx electrode lines TI to Tj several times, so as to secure a sufficient sensing time of the Tx electrode lines T1 to Tj.

The Rx driving circuit 304 receives the voltage of the touch sensors through Rx channels connected to the Rx electrode lines R1 to Ri and samples a sensing voltage of the touch sensors under the control of the touch controller 306. The Rx driving circuit 304 may repeatedly sample the output of each of the touch sensors in one touch frame several times in conformity with the repeated supplying of the touch driving pulse. The Rx driving circuit 304 converts the sampling voltage into touch raw data through the analog-to-digital conversion and transmits the touch raw data to the touch controller 306.

The touch controller 306 is connected to the Tx driving circuit 302 and the Rx driving circuit 304 through an interface such as an $I_2C$ bus, a serial peripheral interface (SPI), and a system bus. The touch controller 306 supplies a setup signal to the Tx driving circuit 302 and sets the Tx channel to output the touch driving pulse. The touch controller 306 generates a sensing enable based on a display timing of the video data RGB and supplies the sensing enable to the Rx driving circuit 304, thereby controlling a sampling timing of the voltage of the touch sensors The touch controller 306 analyzes the touch raw data received from the Rx driving circuit 304 using a previously determined touch recognition algorithm and calculates touch coordinates. Data of the touch coordinates output from the touch controller 306 may be transmitted to the external host system in a human interface device (HID) format. The host system runs an application program which the touch coordinates indicate.

Figure 4:
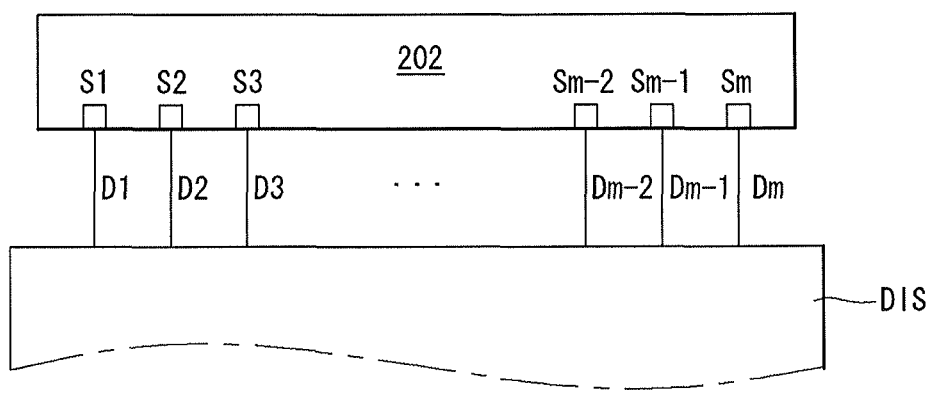
FIG. 4 illustrates source output channels of a data driving circuit which are respectively connected to data lines.
Figure 5:
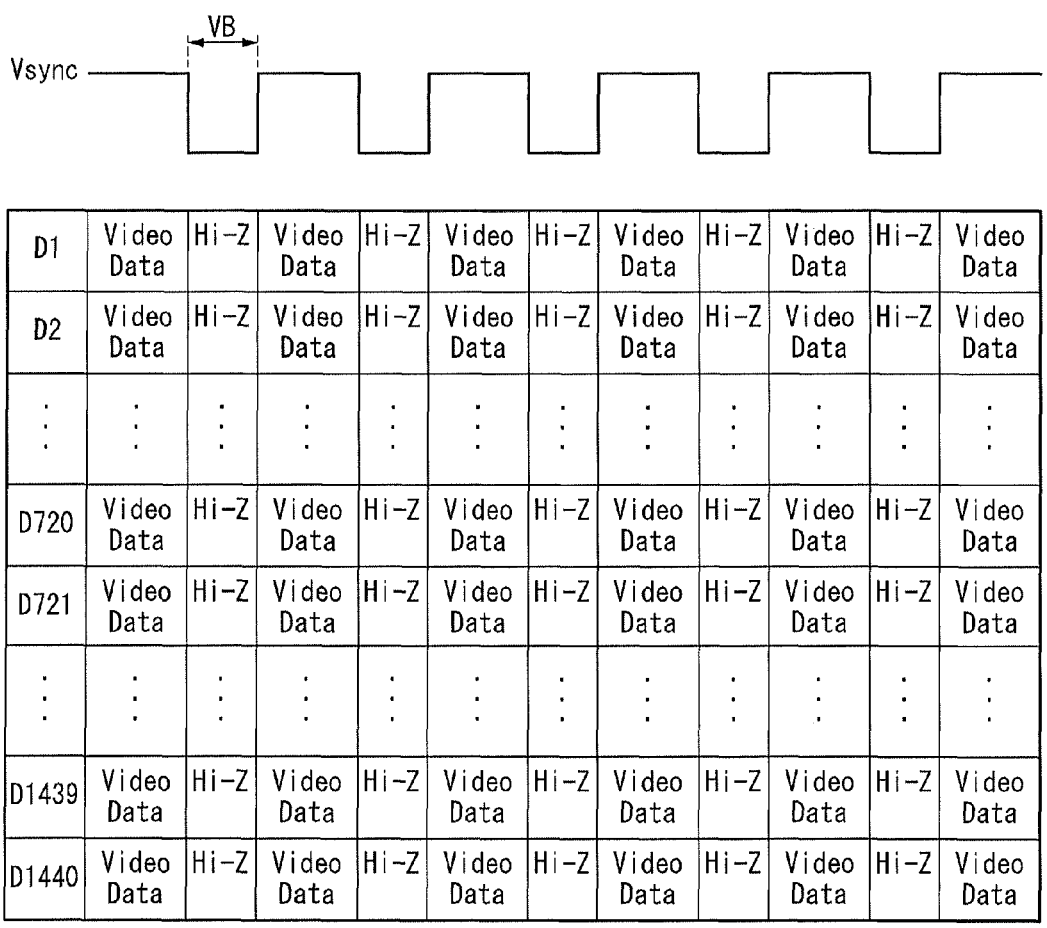
FIG. 5 illustrates an example where data lines are floated in vertical blank periods in a lump.
Figure 7:
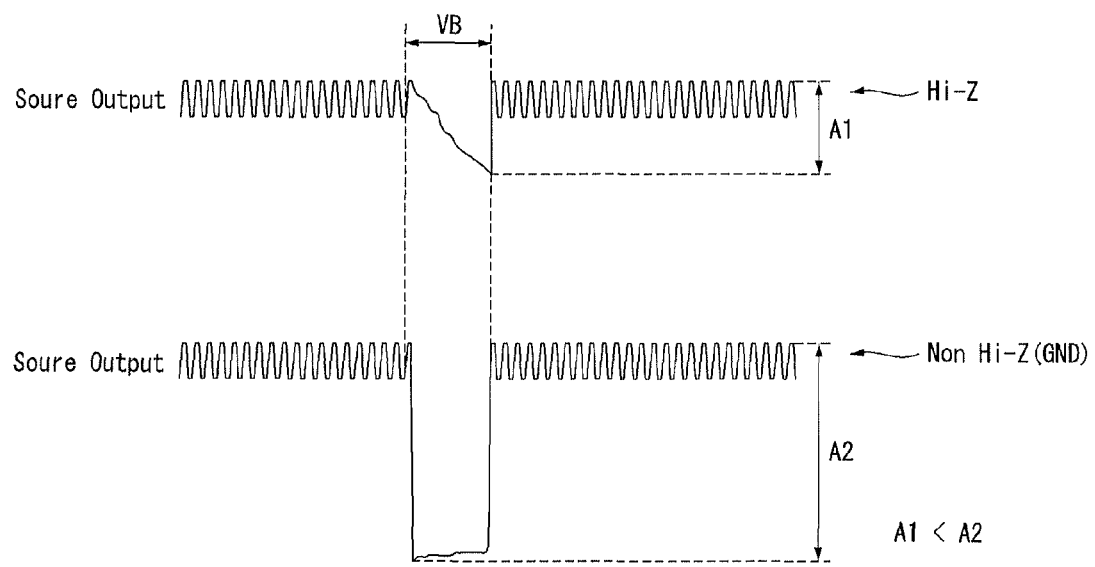
FIG. 7 illustrates a comparison between a change width of a potential of a data line in a floating state of FIG. 5 and a change width of a potential of the data line in a non-floating state of FIG. 6.

FIG. 4 illustrates source output channels of the data driving circuit 202 which are respectively connected to the data lines D1 to Dm. FIG. 5 illustrates an example where the data lines D1 to D1440 are floated in vertical blank periods in a lump. FIG. 6 illustrates an example where the data lines D1 to D1440 are set to a predetermined voltage in the vertical blank periods in a lump. FIG. 7 illustrates a comparison between a change width of a potential of the data line in a floating state of FIG. 5 and a change width of a potential of the data line in a non-floating state of FIG. 6.

The embodiment of the invention may float source output channels S1 to Sm of the data driving circuit 202 shown in FIG. 4 in a lump in vertical blank periods VB and may set a potential of the data lines D1 to D1440 to a floating state (Hi-Z) in a lump in the vertical blank periods VB as shown in FIG. 5. As described above, as shown in FIG. 7, when the potential of the data lines D1 to D1440 is set to the floating state (Hi-Z) in a lump in the vertical blank periods VB, a change width A1 of the potential of the data line in the vertical blank periods VB is relatively small. Hence, a coupling noise may decrease. However, when the potential of the data lines D1 to D1440 is set to the floating state (Hi-Z) in a lump in the vertical blank periods VB, a reduction in image quality, for example, line dim may be caused because of several factors.

To prevent the reduction in image quality, the embodiment of the invention may connect the source output channels S1 to Sm of the data driving circuit 202 shown in FIG. 4 to a supply terminal of a predetermined voltage (for example, a ground level voltage GND) in a lump in the vertical blank periods VB and may set the potential of the data lines D1 to D1440 to a non-floating state (Non Hi-Z) in a lump in the vertical blank periods VB as shown in FIG. 6. However, as shown in FIG. 7, when the potential of the data lines D1 to D1440 is set to the non-floating state (Non Hi-Z) in a lump in the vertical blank periods VB, a change width A2 of the potential of the data lines in the vertical blank periods VB is greater than the change width A1 of the potential of the data lines in the floating state (Hi-Z). Hence, the coupling noise increases.

Accordingly, the embodiment of the invention proposes a method capable of minimizing the coupling noise without the reduction in image quality. For this, the embodiment of the invention may selectively set the potential of the data lines to the floating state (Hi-Z) and the non-floating state (Non Hi-Z) in the vertical blank periods VB based on time, position, or time and position in different manners. The embodiment of the invention may select the voltage, which is applied to the data lines D1 to D1440 from the source output channels S1 to Sm of the data driving circuit 202, among the ground level voltage GND shown in FIG. 13, a predetermined power voltage Vs shown in FIG. 14, and a previous frame voltage Vd shown in FIG. 15 in the vertical blank periods VB, so as to set the potential of the data lines D1 to D1440 to the non-floating state (Non Hi-Z).

Figure 8:
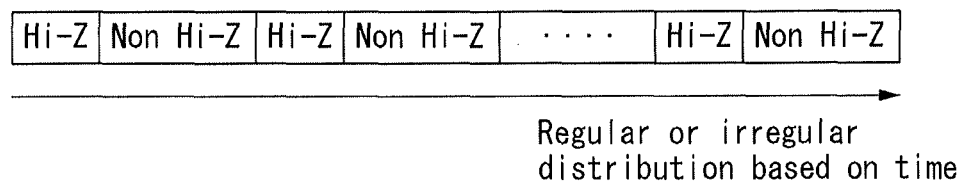
FIG. 8 illustrates an example of changes in a potential of data lines in vertical blank periods based on time.
Figure 9:
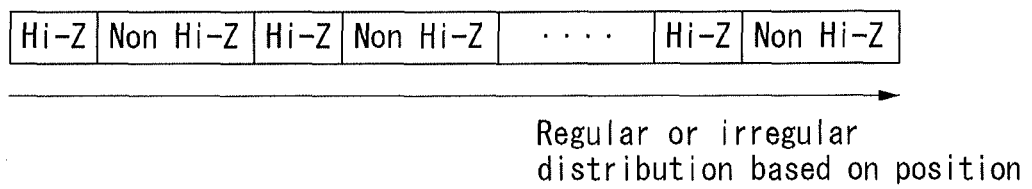
FIG. 9 illustrates an example of changes in a potential of data lines in vertical blank periods based on position.

FIG. 8 illustrates an example of changes in the potential of the data lines in the vertical blank periods based on time. FIG. 9 illustrates an example of changes in the potential of the data lines in the vertical blank periods based on position.

As shown in FIG. 8, the potential of the data lines is alternately in the floating state (Hi-Z) and the non-floating state (Non Hi-Z) in the vertical blank periods VB. In this instance, the potential of the data lines may be alternately in the floating state (Hi-Z) and the non-floating state (Non Hi-Z) at predetermined time intervals. The predetermined time intervals may be regularly or irregularly determined. The potential of all of the source output channels may be alternately in the floating state (Hi-Z) and the non-floating state (Non Hi-Z) at intervals of X (where X is a natural number) frames in the vertical blank periods VB, so that the floating state (Hi-Z) and the non-floating state (Non Hi-Z) are distributed at regular time intervals. Further, the potential of all of the source output channels may be alternately in the floating state (Hi-Z) and the non-floating state (Non Hi-Z) at irregular intervals of frame in the vertical blank periods VB, so that the floating state Hi-Z and the non-floating state Non Hi-Z are distributed at irregular time intervals.

As shown in FIG. 9, the potential of the data lines is alternately in the floating state (Hi-Z) and the non-floating state (Non Hi-Z) in the vertical blank periods VB. In this instance, the potential of the data lines may be alternately in the floating state (Hi-Z) and the non-floating state (Non Hi-Z) at predetermined position intervals. The predetermined position intervals may be regularly or irregularly determined. The potential of the source output channels may be alternately in the floating state (Hi-Z) and the non-floating state (Non Hi-Z) at intervals of Y (where Y is a natural number) channels in the vertical blank periods VB, so that the floating state (Hi-Z) and the non-floating state (Non Hi-Z) are distributed at regular intervals of position. Further, the potential of the source output channels may be alternately in the floating state (Hi-Z) and the non-floating state (Non Hi-Z) at irregular intervals of channel in the vertical blank periods VB, so that the floating state (Hi-Z) and the non-floating state (Non Hi-Z) are distributed at irregular intervals of position.

Although not shown, the potential of the data lines may be alternately in the floating state (Hi-Z) and the non-floating state (Non Hi-Z) at predetermined time intervals and at predetermined position intervals in the vertical blank periods VB. The predetermined time intervals and the predetermined position intervals may be regularly or irregularly determined through the above-described methods. The potential of the source output channels may be alternately in the floating state (Hi-Z) and the non-floating state (Non Hi-Z) at intervals of X frames and at intervals of Y channels in the vertical blank periods VB, so that the floating state (Hi-Z) and the non-floating state (Non Hi-Z) are distributed at regular time intervals and at regular intervals of position. Further, the potential of the source output channels may be alternately in the floating state (Hi-Z) and the non-floating state (Non Hi-Z) at irregular intervals of frame and at irregular intervals of channel in the vertical blank periods VB, so that the floating state (Hi-Z) and the non-floating state (Non Hi-Z) are distributed at irregular time intervals and at irregular intervals of position.

Figure 10:
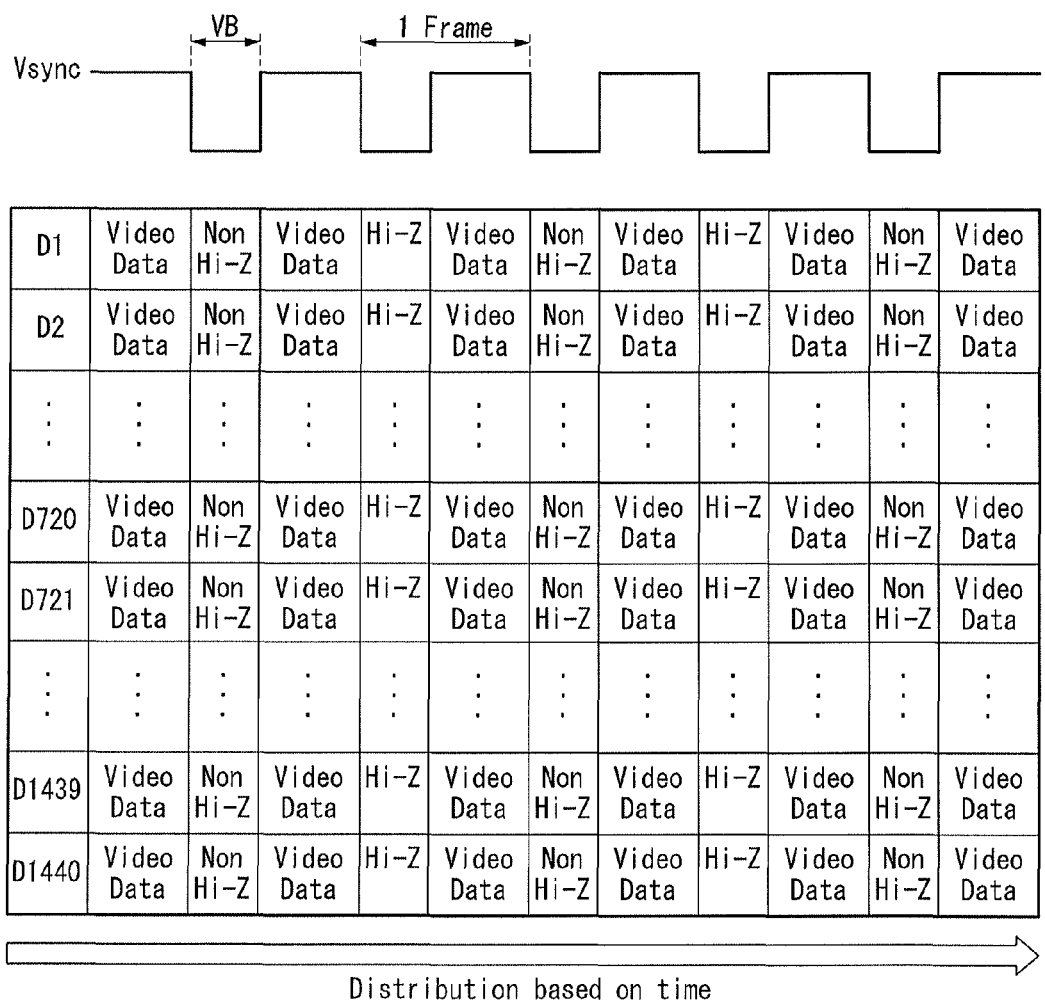
FIG. 10 illustrates an example where a potential of data lines is alternately in a floating state and a non-floating state at intervals of predetermined frames in vertical blank periods.

FIG. 10 illustrates an example where the potential of the data lines is alternately in the floating state and the non-floating state at intervals of predetermined frames in the vertical blank periods.

As shown in FIG. 10, the embodiment of the invention is configured so that the potential of the data lines D1 to D1440 is alternately in the floating state (Hi-Z) and the non-floating state (Non Hi-Z) at intervals of one frame in the vertical blank periods VB, thereby minimizing the coupling noise without the reduction in image quality. The embodiment of the invention may improve a touch performance without increasing a sampling rate by reducing the coupling noise. FIG. 10 shows that the floating state (Hi-Z) and the non-floating state (Non Hi-Z) are regularly distributed at intervals of one frame. However, the embodiment of the invention is not limited thereto. For example, the floating state (Hi-Z) and the non-floating state (Non Hi-Z) may be regularly distributed at intervals of two or more frames. Further, the floating state (Hi-Z) and the non-floating state (Non Hi-Z) may be distributed at irregular intervals of frame.

Figure 11:
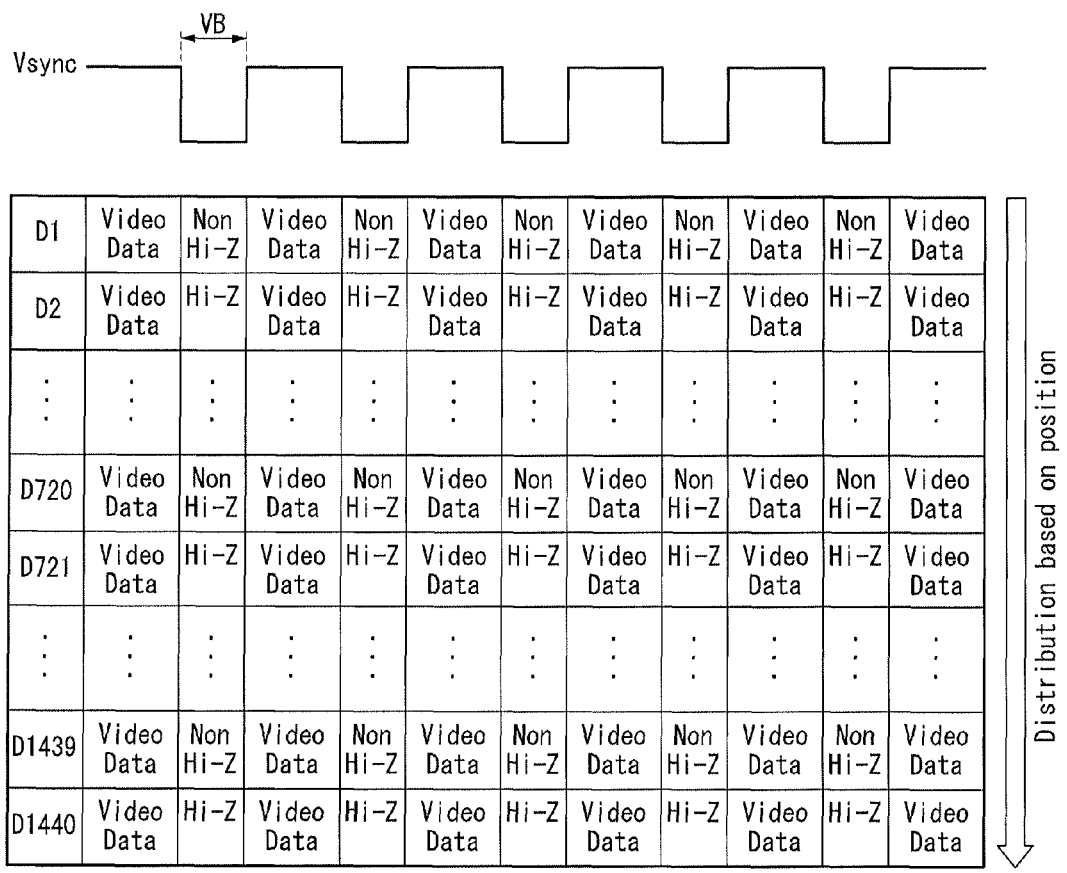
FIG. 11 illustrates an example where a potential of data lines is alternately in a floating state and a non-floating state at predetermined position intervals in vertical blank periods.

FIG. 11 illustrates an example where the potential of the data lines is alternately in the floating state and the non-floating state at predetermined position intervals in the vertical blank periods.

As shown in FIG. 11, the embodiment of the invention is configured so that the potential of the data lines D1 to D1440 is alternately in the floating state (Hi-Z) and the non-floating state (Non Hi-Z) at intervals of one channel in the vertical blank periods VB, thereby minimizing the coupling noise without the reduction in image quality. The embodiment of the invention may improve the touch performance without increasing the sampling rate by reducing the coupling noise. FIG. 11 shows that the floating state (Hi-Z) and the non-floating state (Non Hi-Z) are regularly distributed at intervals of one channel. However, the embodiment of the invention is not limited thereto. For example, the floating state (Hi-Z) and the non-floating state (Non Hi-Z) may be regularly distributed at intervals of two or more channels. Further, the floating state (Hi-Z) and the non-floating state (Non Hi-Z) may be distributed at irregular intervals of channel.

FIG. 12 illustrates an example where the potential of the data lines is alternately in the floating state and the non-floating state at predetermined time intervals and at predetermined position intervals in the vertical blank periods.

As shown in FIG. 12, the embodiment of the invention is configured so that the potential of the data lines D1 to D1440 is alternately in the floating state (Hi-Z) and the non-floating state (Non Hi-Z) at intervals of one frame and at intervals of 720 channels in the vertical blank periods VB, thereby minimizing the coupling noise without the reduction in image quality. The embodiment of the invention may improve the touch performance without increasing the sampling rate by reducing the coupling noise. FIG. 12 shows that the floating state (Hi-Z) and the non-floating state (Non Hi-Z) are regularly distributed at intervals of one frame and at intervals of 720 channels. However, the embodiment of the invention is not limited thereto. For example, the floating state (Hi-Z) and the non-floating state (Non Hi-Z) may be regularly distributed at intervals of two or more frames and at intervals of the number of channels other than 720. Further, the floating state (Hi-Z) and the non-floating state (Non Hi-Z) may be distributed at irregular intervals of frame and at irregular intervals of channel.

Figure 13:
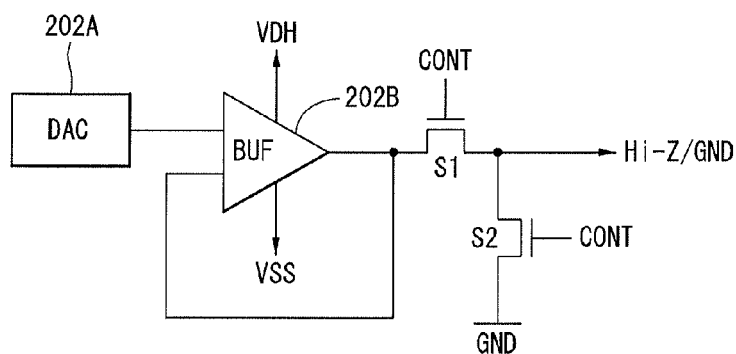
FIGS. 13 to 15 illustrate various configuration examples of a data driving circuit for selectively setting a potential of data lines to a floating state and a non-floating state in vertical blank periods.
Figure 14:
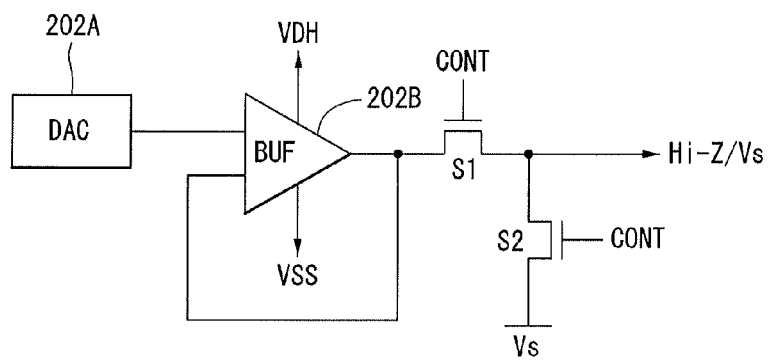
Figure 15:
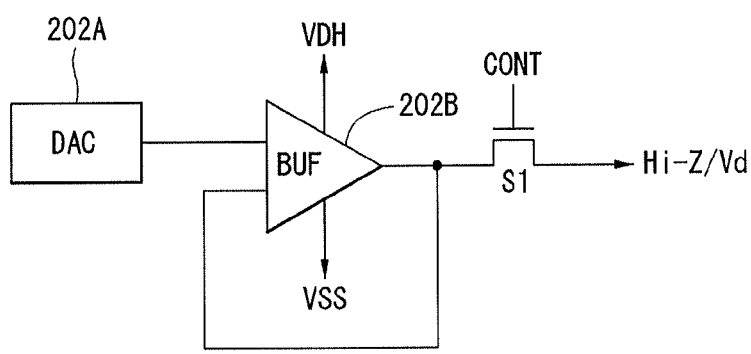

FIGS. 13 to 15 illustrate various channel configurations of the data driving circuit for selectively setting the potential of the data lines to the floating state and the non-floating state in the vertical blank periods.

The data driving circuit 202 shown in FIG. 13 supplies the ground level voltage GND to the data lines, so as to selectively set the potential of the data lines to the non-floating state Non Hi-Z in the vertical blank periods. For this, one channel configuration of the data driving circuit 202 may include a digital-to-analog converter (DAC) 202A which converts input digital video data into the data voltage, an output buffer (BUF) 202B which stabilizes the data voltage and outputs the stabilized data voltage, a first switch S1 which selectively opens an output terminal of the output buffer 202B, and a second switch S2 which selectively supplies the ground level voltage GND to the data lines.

The first switch S1 and the second switch S2 are turned on or off in response to the control signal CONT received from the timing controller 400.

When the first switch S1 is turned off and the second switch S2 is turned on in response to the control signal CONT in the vertical blank periods, the ground level voltage GND is supplied to the data lines. Hence, the potential of the data lines is set to the non-floating state (Non Hi-Z). On the other hand, when both the first switch S1 and the second switch S2 are turned off in response to the control signal CONT in the vertical blank periods, the potential of the data lines is set to the floating state (Hi-Z).

Because the first switch S1 and the second switch S2 are respectively held in a turned-on state and a turned-off state in response to the control signal CONT in screen display periods between the vertical blank periods, the data voltage for the display of the gray level is supplied to the data lines.

The data driving circuit 202 shown in FIG. 14 supplies the predetermined power voltage Vs to the data lines, so as to selectively set the potential of the data lines to the non-floating state (Non Hi-Z) in the vertical blank periods. For this, one channel configuration of the data driving circuit 202 may include a digital-to-analog converter (DAC) 202A which converts input digital video data into the data voltage, an output buffer (BUF) 202B which stabilizes the data voltage and outputs the stabilized data voltage, a first switch S1 which selectively opens an output terminal of the output buffer 202B, and a second switch S2 which selectively supplies the predetermined power voltage Vs to the data lines.

The first switch S1 and the second switch S2 are turned on or off in response to the control signal CONT received from the timing controller 400.

When the first switch S1 is turned off and the second switch S2 is turned on in response to the control signal CONT in the vertical blank periods, the predetermined power voltage Vs is supplied to the data lines. Hence, the potential of the data lines is set to the non-floating state (Non Hi-Z). On the other hand, when both the first switch S1 and the second switch S2 are turned off in response to the control signal CONT in the vertical blank periods, the potential of the data lines is set to the floating state (Hi-Z).

Because the first switch S1 and the second switch S2 are respectively held in a turned-on state and a turned-off state in response to the control signal CONT in the screen display periods between the vertical blank periods, the data voltage for the display of the gray level is supplied to the data lines.

The data driving circuit 202 shown in FIG. 15 supplies the previous frame voltage Vd to the data lines, so as to selectively set the potential of the data lines to the non-floating state (Non Hi-Z) in the vertical blank periods. For this, one channel configuration of the data driving circuit 202 may include a digital-to-analog converter (DAC) 202A which converts input digital video data into the data voltage, an output buffer (BUF) 202B which stabilizes the data voltage and outputs the stabilized data voltage, and a first switch S1 which selectively opens an output terminal of the output buffer 202B.

The first switch S1 is turned on or off in response to the control signal CONT received from the timing controller 400.

When the first switch S1 is turned on in response to the control signal CONT in the vertical blank periods, the previous frame voltage Vd is continuously supplied to the data lines. Hence, the potential of the data lines is set to the non-floating state (Non Hi-Z). On the other hand, when the first switch S1 is turned off in response to the control signal CONT in the vertical blank periods, the potential of the data lines is set to the floating state (Hi-Z).

Because the first switch S1 is held in a turned-on state in response to the control signal CONT in the screen display periods between the vertical blank periods, the data voltage for the display of the gray level is supplied to the data lines.

Figure 17:
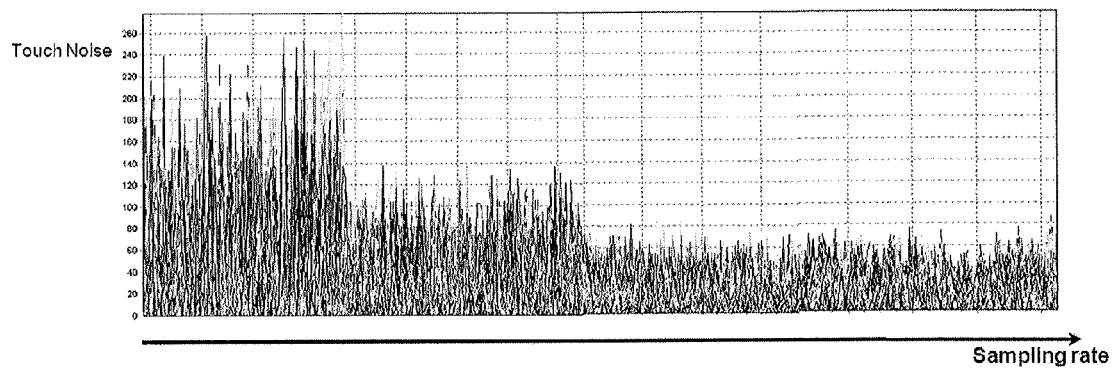
FIG. 17 illustrates a relationship between a touch noise and a sampling rate.

FIG. 16 illustrates a comparison between a magnitude of a touch noise in a related art and a magnitude of a touch noise in the embodiment of the invention. FIG. 17 illustrates a relationship between a touch noise and a sampling rate.

As shown in FIGS. 16 and 17, when the configuration according to the embodiment of the invention was applied to a display device, a coupling noise of the display device was reduced. Hence, the touch noise in the embodiment of the invention was greatly reduced compared to the touch noise in the related art. Further, because the embodiment of the invention does not have to increase the sampling rate of the sensing voltages readout from the touch sensors so as to reduce the coupling noise unlike the related art, power consumption of the readout IC may be reduced.

As described above, the embodiment of the invention may selectively set the potential of the data lines to the floating state and the non-floating state in the vertical blank periods based on time, position, or time and position in different manners, thereby minimizing the coupling noise without the reduction in image quality, for example, the line dim. Furthermore, the embodiment of the invention may improve the touch performance without increasing the sampling rate by reducing the coupling noise.

Although embodiments have been described with reference to a number of illustrative embodiments thereof, it should be understood that numerous other modifications and embodiments may be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensor integrated type display comprising:
a display panel including a touch screen having touch sensors;
a data driving circuit configured to drive data lines of the display panel; and
a timing controller configured to generate a control signal for controlling a potential of an output terminal of the data driving circuit in vertical blank periods between adjacent vertical periods, wherein the control signal selectively floats source output channels of the data driving circuit or selectively sets a potential of the source output channels to a predetermined voltage in the vertical blank periods,
wherein the potential of all of the source output channels of the data driving circuit is alternately in the floating state and the non-floating state at irregular time intervals in the vertical blank periods, wherein the floating state and the non-floating state are distributed at irregular frame intervals.

2. A touch sensor integrated type display comprising:
a display panel including a touch screen having touch sensors;
a data driving circuit configured to drive data lines of the display panel; and
a timinq controller configured to generate a control signal for controlling a potential of an output terminal of the data driving circuit in vertical blank periods between adjacent vertical periods, wherein the control signal selectively floats source output channels of the data driving circuit or selectively sets a potential of the source output channels to a predetermined voltage in the vertical blank periods,
wherein a potential of the data lines is alternately in a floating state and a non-floating state at predetermined position intervals in the vertical blank periods, and
wherein a potential of a first set of at least one data line is in the floating state and a potential of a second set of at least one data line is in the non-floating state at the same timing in one vertical blank period, and
wherein the first set is different from the second set.

3. The touch sensor integrated type display of claim 2, wherein the potential of the source output channels of the data driving circuit is alternately in the floating state and the non-floating state at intervals of Y channels in the vertical blank periods, wherein Y is a natural number, wherein the floating state and the non-floating state are distributed at regular intervals of channel.

4. The touch sensor integrated type display of claim 2, wherein the potential of all of the source output channels of the data driving circuit is alternately in the floating state and the non-floating state at irregular position intervals in the vertical blank periods, wherein the floating state and the non-floating state are distributed at irregular channel intervals.

5. A touch sensor integrated type display comprising:
a display panel including a touch screen having touch sensors;
a data driving circuit configured to drive data lines of the display panel; and
a timing controller configured to generate a control signal for controlling a potential of an output terminal of the data driving circuit in vertical blank periods between adjacent vertical periods, wherein the control signal selectively floats source output channels of the data driving circuit or selectively sets a potential of the source output channels to a predetermined voltage in the vertical blank periods, wherein a potential of the data lines is alternately in a floating state and a non-floating state at predetermined time intervals and at predetermined position intervals in the vertical blank periods, and wherein a potential of a first set of at least one data line is in the floating state and a potential of a second set of at least one data line is in the non-floating state at the same timing in one vertical blank period, and wherein the first set is different from the second set.

6. The touch sensor integrated type display of claim 5, wherein the potential of the source output channels of the data driving circuit is alternately in the floating state and the non-floating state at intervals of X frames and at intervals of Y channels in the vertical blank periods, wherein X and Y are a natural number, wherein the floating state and the non-floating state are distributed at regular frame intervals and at regular channel intervals.

7. The touch sensor integrated type display of claim 5, wherein the potential of all of the source output channels of the data driving circuit is alternately in the floating state and the non-floating state at irregular time intervals and at irregular position intervals in the vertical blank periods, wherein the floating state and the non-floating state are distributed at irregular frame intervals and at irregular channel intervals.

8. A method for driving a touch sensor integrated type display including a display panel including a touch screen having touch sensors and a data driving circuit for driving data lines of the display panel, the method comprising:

generating a control signal for controlling a potential of source output channels of the data driving circuit in vertical blank periods between adjacent vertical periods; and selectively floating source output channels of the data driving circuit or selectively setting a potential of the source output channels to a predetermined voltage in the vertical blank periods in response to the control signal, wherein the potential of all of the source output channels of the data driving circuit is alternately in the floating state and the non-floating state at irregular time intervals in the vertical blank periods, wherein the floating state and the non-floating state are distributed at irregular frame intervals.

9. A method for driving a touch sensor integrated type display including a display panel including a touch screen having touch sensors and a data driving circuit for driving data lines of the display panel, the method comprising:

generating a control signal for controlling a potential of source output channels of the data driving circuit in vertical blank periods between adjacent vertical periods; and selectively floating source output channels of the data driving circuit or selectively setting a potential of the source output channels to a predetermined voltage in the vertical blank periods in response to the control signal, wherein a potential of the data lines is alternately in a floating state and a non-floating state at predetermined position intervals in the vertical blank periods, and wherein a potential of a first set of at least one data line is in the floating state and a potential of a second set of at least one data line is in the non-floating state at the same timing in one vertical blank period, and wherein the first set is different from the second set.

10. The method of claim 9, wherein the potential of the source output channels of the data driving circuit is alternately in the floating state and the non-floating state at intervals of Y channels in the vertical blank periods, wherein Y is a natural number, wherein the floating state and the non-floating state are distributed at regular channel intervals.

11. The method of claim 9, wherein the potential of all of the source output channels of the data driving circuit is alternately in the floating state and the non-floating state at irregular position intervals in the vertical blank periods, wherein the floating state and the non-floating state are distributed at irregular of channel.

12. A method for driving a touch sensor integrated type display including a display panel including a touch screen having touch sensors and a data driving circuit for driving data lines of the display panel, the method comprising:

generating a control signal for controlling a potential of source output channels of the data driving circuit in vertical blank periods between adjacent vertical periods; and selectively floating source output channels of the data driving circuit or selectively setting a potential of the source output channels to a predetermined voltage in the vertical blank periods in response to the control signal, wherein a potential of the data lines is alternately in a floating state and a non-floating state at predetermined time intervals and at predetermined position intervals in the vertical blank periods, and wherein a potential of a first set of at least one data line is in the floating state and a potential of a second set of at least one data line is in the non-floating state at the same timing in one vertical blank period, and wherein the first set is different from the second set.

13. The method of claim 12, wherein the potential of the source output channels of the data driving circuit is alternately in the floating state and the non-floating state at intervals of X frames and at intervals of Y channels in the vertical blank periods, wherein X and Y are a natural number, wherein the floating state and the non-floating state are distributed at regular frame intervals and at regular channel intervals.

14. The method of claim 12, wherein the potential of all of the source output channels of the data driving circuit is alternately in the floating state and the non-floating state at irregular time intervals and at irregular position intervals in the vertical blank periods, wherein the floating state and the non-floating state are distributed at irregular frame intervals and at irregular channel intervals.

15. The touch sensor integrated type display of claim 1, wherein a sampling rate of a potential on touch sensing lines connected to the touch sensors remains unchanged.

16. The method of claim 8, wherein a sampling rate of a potential on touch sensing lines connected to the touch sensors remains unchanged.

* * * * *